Patented Apr. 3, 1928.

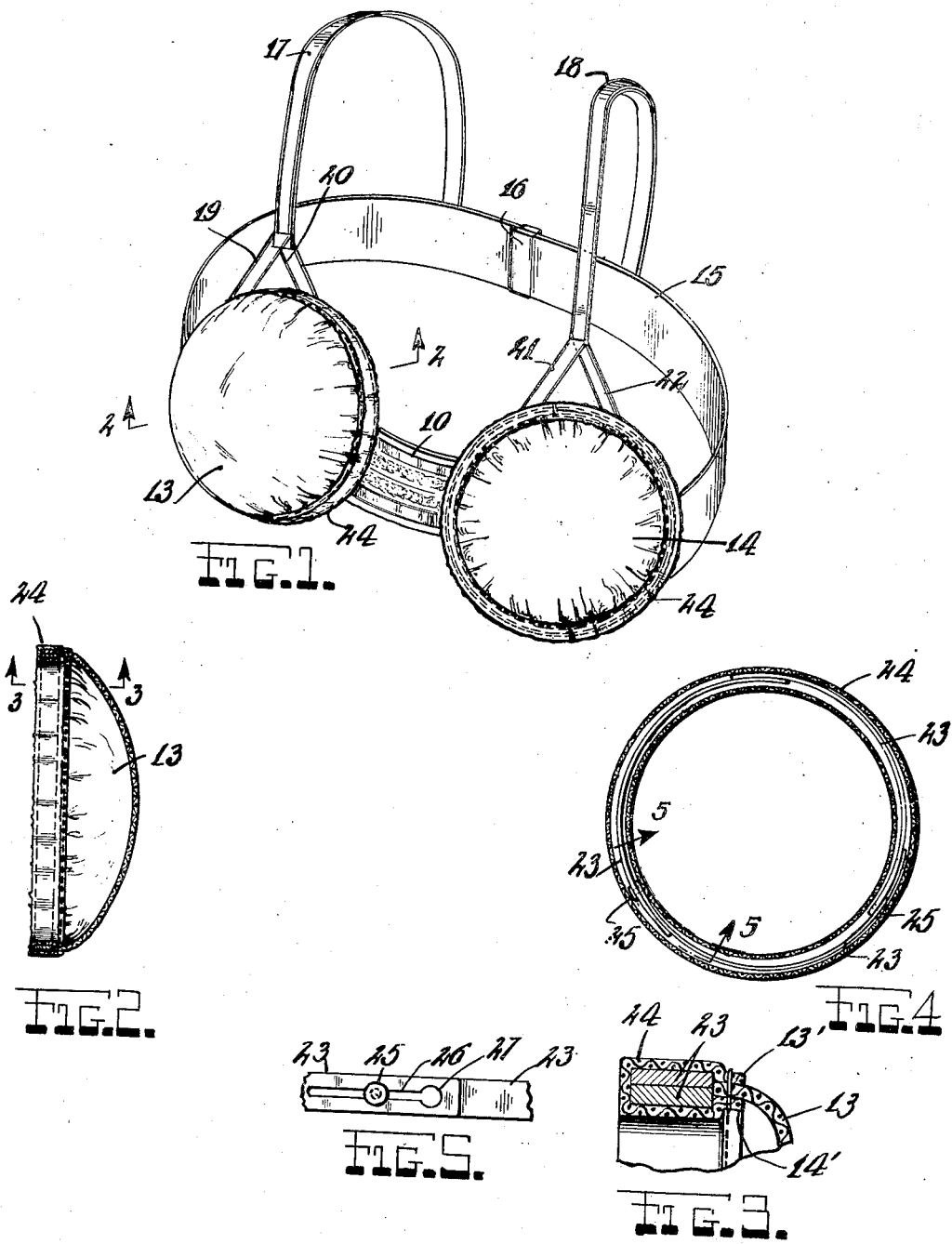

1,664,926

UNITED STATES PATENT OFFICE.

HARRIET IMERSHEIN AND LOUIS E. GINSBURG, OF NEW YORK, N. Y., ASSIGNORS TO FAIRY BRASSIERE CO., INC., A CORPORATION OF NEW YORK.

BRASSIÈRE BUST SUPPORTER.

Application filed February 16, 1927. Serial No. 168,597.

This invention relates to a new and useful device in the nature of brassière such as worn by women.

The object of the invention is to provide a brassière of novel construction and arrangement of parts, hereinafter more fully described, claimed, and illustrated in the accompanying drawing, in which:—

Fig. 1 shows a perspective view of our improved brassière.

Fig. 2 is an enlarged sectional view taken on the line 2—2 of Fig. 1.

Fig. 3 is a sectional view taken on the line 3—3 of Fig. 2.

Fig. 4 is a sectional view of my improved device.

Fig. 5 is a fragmentary detail view showing the method of attaching the expansion members, taken on the line 5—5 of Fig. 4.

As here embodied the elastic member 10 is extended between and attached to the bust supports 13 and 14. The usual brassière body 15, comprising two bands, is attached to the bust supports 13 and 14, and is removably attached as at 16, by the usual snap fasteners, hooks and eyes, or the like. The straps 17 and 18, are attached, at one extremity, to the rear of the brassière body 15, adjacent to the snap fasteners 16, and are attached, at their other extremity, to the supplementary straps 19, 20, and 21, 22, attached to the upper portion of the bust supporters 13 and 14, respectively.

The bust supporters 13 and 14, comprise a plurality of segment members 23, of any expansion material. The segment members 23, are positioned in a circular or oblong ring-shaped aperture formed by extending the covering 24, around the said segment members 23, sewn, stitched, or otherwise attached to the brassière supports 13 and 14, as at 13' and 14'. It being understood that the segment members 23, are of suitable length to extend partly over one another, as clearly shown in the accompanying drawing. The segment members 23 are slidably engaged upon each other at their end portions and each segment member is a segment having substantially the same radius. The material of which the segment members 23 are made is sufficiently resilient to cause them to return to a predetermined shape after the frame formed of these segments has been expanded. It should be understood that the covering material 24 is disposed completely around the overlapped segments 23 and that there is sufficient covering material provided throughout the circumference of the circular frame, which is constructed of segments 23, to permit expansion of the frame before the device is disposed over a breast. When the device is suitably positioned over a breast and the frame is permitted to contract the portion of the breast disposed within the frame is forced outwardly and held firmly against the covering material 24 which is also disposed over one end of the circular frame; it being understood that the contraction of the frame is brought about by the tendency of the segment members 23 to assume an arcuate form of predetermined radius.

The above described construction being such as will permit the segment members 23 to pull or draw the bust supports 13 and 14, tightly over the busts of the wearer.

In Fig. 5 of the accompanying drawing, we have shown, an extended member 25, attached to one extremity of the segment members 23, and provided with an enlarged head. The extremity of the adjacent segment members 23, have formed therein, elongated apertures 26, adapted to be engaged by the extended members 25. The elongated apertures 26 are provided with an enlarged extremity 27, positioned at the inner extremity of the elongated aperture 26, so as to permit the extended members 25 to be engaged in the elongated apertures 26. The above described construction being such as will secure the proper positioning of the segment members 23, so as to provide equal expansion thereof.

Having thus described our invention, what we claim as new and desire to protect by Letters Patent of the United States are as follows:—

1. In a brassière, segment members positioned in a covering, attached to brassière supporters, said segment members extending partly over one another, extended members, provided with enlarged heads, said extended members attached to one extremity of the said segment members, the extremities of the adjacent said segment members having formed therein elongated apertures adapted to be engaged by the said extended members, said elongated apertures provided with enlarged inner extremities, so as to permit engagement of the said extended members in the said elongated apertures.

2. In a brassière of the class described, a circular frame comprising individual segment members of substantially equal radii slidably engaged at their ends in overlapped relation, a covering member disposed over one end of said frame, a covering member disposed around the sides of said circular frame adapted to retain said segment members in overlapped relation and stitched to said end covering member, said circular frame being adapted to be expanded within the covering member thereof, and to contract when released to a predetermined size, and straps attached to said covering members for suitably positioning said frames on a wearer.

In testimony whereof we have affixed our signatures.

HARRIET IMERSHEIN.
LOUIS E. GINSBURG.